United States Patent [19]

Ohsawa et al.

[11] 4,194,743

[45] Mar. 25, 1980

[54] RECORD PLAYER

[75] Inventors: Mitsuo Ohsawa, Chigasaki; Hiroshi Nakazawa, Kawagoe, both of Japan

[73] Assignee: Sony Corporation, Tokyo, Japan

[21] Appl. No.: 943,748

[22] Filed: Sep. 19, 1978

[30] Foreign Application Priority Data

Sep. 22, 1977 [JP] Japan .................... 52-127763[U]

[51] Int. Cl.² .................... G11B 3/60; H02K 1/22; H02K 21/12
[52] U.S. Cl. .................... 274/1 E; 310/268
[58] Field of Search .................. 274/1 E, 39 R, 39 A; 310/268; 335/305

[56] References Cited

U.S. PATENT DOCUMENTS

| Re. 29,451 | 10/1977 | Baermann | 335/303 |
|---|---|---|---|
| 1,915,090 | 6/1933 | Hammond | 274/39 A |
| 3,218,081 | 11/1965 | Gentilini | 274/39 R |
| 3,244,423 | 4/1966 | Freathy et al. | 274/23 B |
| 3,683,248 | 8/1972 | Kobayashi et al. | 274/39 A |
| 3,786,288 | 1/1974 | Joannou | 274/39 R |
| 3,872,334 | 3/1975 | Loubier | 335/303 |
| 3,988,024 | 10/1976 | Watanabe et al. | 274/39 A |
| 4,131,828 | 12/1978 | Houshi | 274/39 R |

Primary Examiner—John W. Shepperd
Attorney, Agent, or Firm—Lewis H. Eslinger; Alvin Sinderbrand

[57] ABSTRACT

In a record player, a turntable is rotatably mounted on a base, and a rotor structure, such as an annular magnet, is mounted on the turntable and cooperates with a stator aperture mounted on the base to cause the turntable to rotate. The annular magnet is preferably a rubber magnet formed by molding rubber mixed with a ferrite powder. For the sake of stability, the annular magnet is in close proximity to the circumference of the turntable. The stator aperture preferably includes bobbins on which stator coils are wound, and arcuate tongues, integral with the base, on which the bobbins are arranged and which form magnetic cores for the stator coils.

19 Claims, 11 Drawing Figures

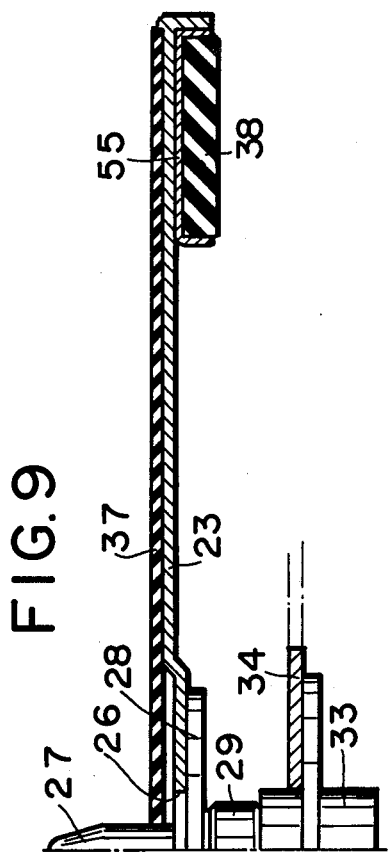

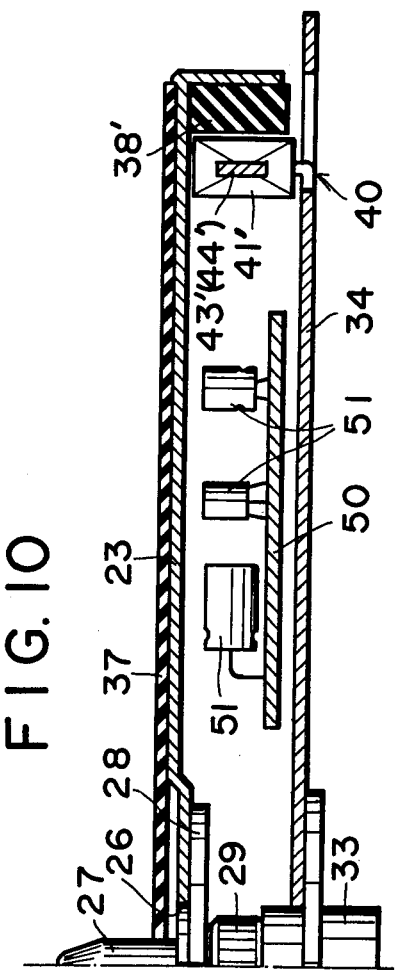

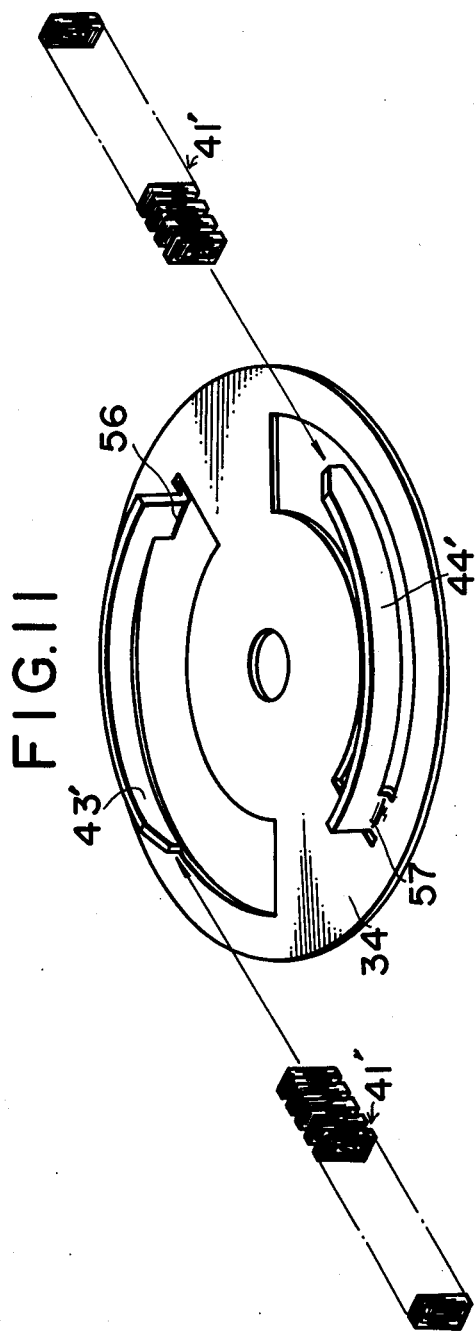

RECORD PLAYER

BACKGROUND OF THE INVENTION

1. Field of the Invention

This invention relates generally to a record player, and more particularly is directed to a record player turntable integrally provided with at least part of an electric motor for driving the same.

2. Description of the Prior Art

In a conventional phonograph record player, a turntable is driven by an electric motor, either by direct drive, or through a belt or other transmission. Even in a direct-drive turntable assembly, a separate motor is provided. Typically, to obtain maximum performance, the turntable of a record player is driven by a DC brushless motor which usually includes a permanent-magnet rotor and a coil stator. The motor is aligned with the axis of the turntable and connected thereto by a motor shaft that can also form the spindle of the turntable.

In such a direct-drive arrangement, the motor and other parts of the drive assembly require a significant amount of space in the vertical direction. Conventional phonographs must be constructed so as to accomodate the vertical dimension of the motor and drive assembly, and, as a result, the vertical dimension of such phonographs is required to be many times as great as the thickness of the turntable itself. Also, in conventional phonograph record players, the diameter of the motor is relatively small. Thus, the permanent magnet associated with the rotor has to be highly magnetized, and a relatively high current has to be supplied to the coil in order to produce sufficient torque for rotating the turntable. Such rotor and coil can produce flux leakage which can, in turn, produce noise in a magnetic pickup cartridge used in conjunction with the phonograph.

OBJECTS AND SUMMARY OF THE INVENTION

Accordingly, it is an object of this invention to provide a compact turntable assembly for a phonograph record player.

It is another object of this invention to provide a turntable assembly which is substantially flat.

Still another object of this invention is to provide a turntable assembly requiring relatively few parts.

A further object of this invention is to provide a phonograph record player affording smooth rotation to the turntable thereof.

A still further object of this invention is to provide a turntable assembly for a phonograph record player in which the turntable assembly is integrally provided with at least part of an electric motor.

A still further object of this invention is to provide a turntable assembly for a phonograph record player integrally provided with at least part of an electric motor, and in which sufficient torque to drive the turntable is obtained without the need for a highly magnetized rotor magnet and without the need to supply high current to the stator.

A still further object of this invention is to provide a turntable assembly for a phonograph record player as aforesaid, and which can be easily and relatively inexpensively manufactured.

According to an aspect of the present invention, the turntable assembly of a record player includes a base, a turntable rotatably mounted on the base, a rotor mounted on the turntable to provide a magnetic field, and a stator assembled on the base and confronting the magnetic field of the rotor for exerting a torque on the rotor so that the turntable is made to rotate.

In a preferred embodiment of the invention, the rotor includes an annular rubber magnet, for example, molded of rubber mixed with a ferrite powder, and consisting of n circumferentially arranged sections, wherein n is a positive even integer, with the sections being magnetized so that the direction of magnetization of the annular magnet alternates from each section to the next adjaent section. The stator assembly of a preferred embodiment includes a pair of coil assemblies arranged on respective tongues formed integrally on the base so that the tongues constitute magnetic cores for the coil assemblies. For simplicity of manufacture, it is preferred that each coil assembly includes plural bobbins on which wire coils are wound, and which have hollow portions through which the respective tongue extends. The coil assemblies and the annular magnet can be arranged to confront each other either in the axial direction or in the radial direction with respect to the turntable.

The above, and other objects, features, and advantages of this invention, will be apparent from the following detailed description of illustrative embodiments, which is to be read in conjunction with the accompanying drawings.

BRIEF DESCRIPTION OF THE DRAWINGS

FIG. 9 is a cross-sectional view of a portion of a turntable assembly according to a second embodiment of this invention;

FIG. 10 is a cross-sectional view of a turntable assembly according to a third embodiment of this invention; and FIG. 11 is an exploded perspective view of a coil assembly included in the turntable assembly of FIG. 10.

DESCRIPTION OF THE PREFERRED EMBODIMENTS

Figure 1:
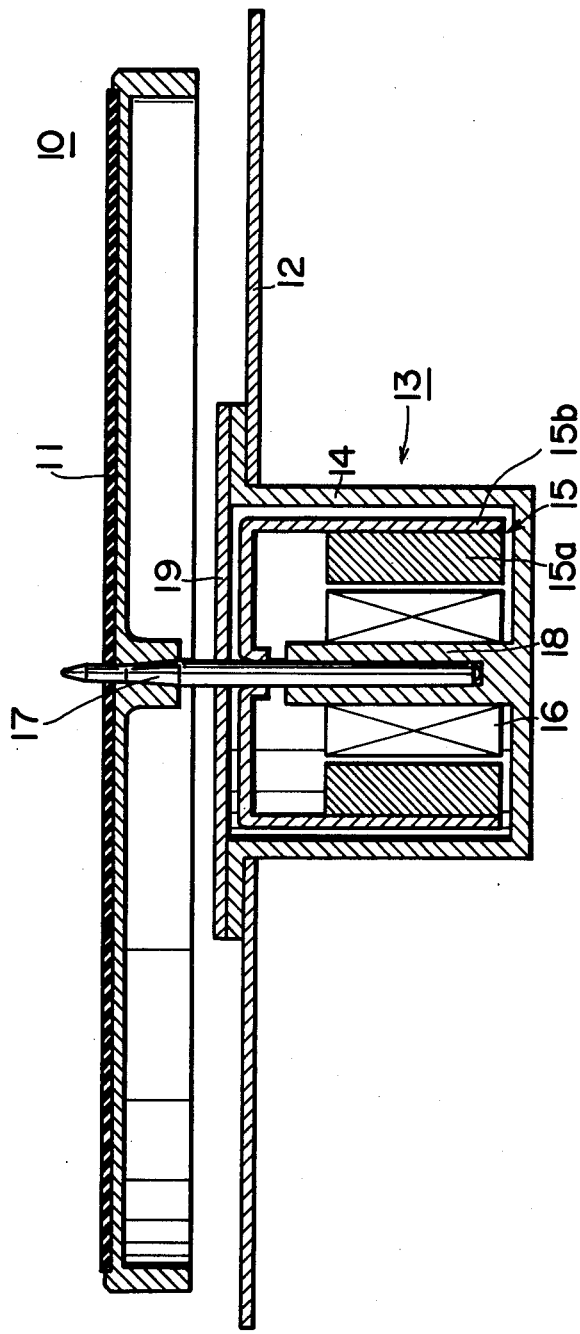
FIG. 1 is a cross-sectional view of a turntable assembly in a conventional record player.

Before proceeding with a detailed description of embodiments of the invention, and for the purpose of clearly contrasting therewith, an example of a conventional turntable assembly 10 for use with a phonograph record player will be described with reference to FIG. 1. The turntable assembly 10 is shown to include a turntable 11, a base or chassis 12 and a DC brushless motor 13 mounted on the chassis 12 for driving the turntable 11. Within a casing 14 of the motor 13, there is provided a permanent-magnet rotor 15 and a stator 16. The rotor 15 includes a permanent-magnet rotor magnet 15a which is fixed to a rotor yoke 15b. The rotor yoke 15b is attached to a motor shaft 17 which is supported in casing 14 by a bearing 18, and which drives turntable 14. The stator 16 is constituted by coils wound around the bearing 18 of the motor 13, so as to face or confront the rotor magnet 15a. Electric current supplied to the coils of stator 16 is changed over in accordance with the detected position of the rotor magnet 15a so that a torque is generated for driving the magnet 15a, the rotor yoke 15b, the shaft 17, and thence, the turntable 11.

In the above conventional arrangement, the motor 13 occupies a substantial amount of space in the vertical or axial direction. As a result, the record player provided with turntable assembly 10 must be constructed with a substantially flat record player. Further, because the diameter of motor 13 is substantially small, the rotor magnet 15a has to be intensely magnetized and a high current has to be supplied to the coils of stator 16 in order to provide sufficient torque to drive the turntable 11. Relatively intense magnetic field emanate from rotor magnet 15a and also from the coils of stator 16 due to the high current. Therefore, a cap 19 is required to enclose the motor casing 14 and to prevent stray magnetic flux from interfering with a magnetic pick up cartridge used with the phonograph.

Figure 2:
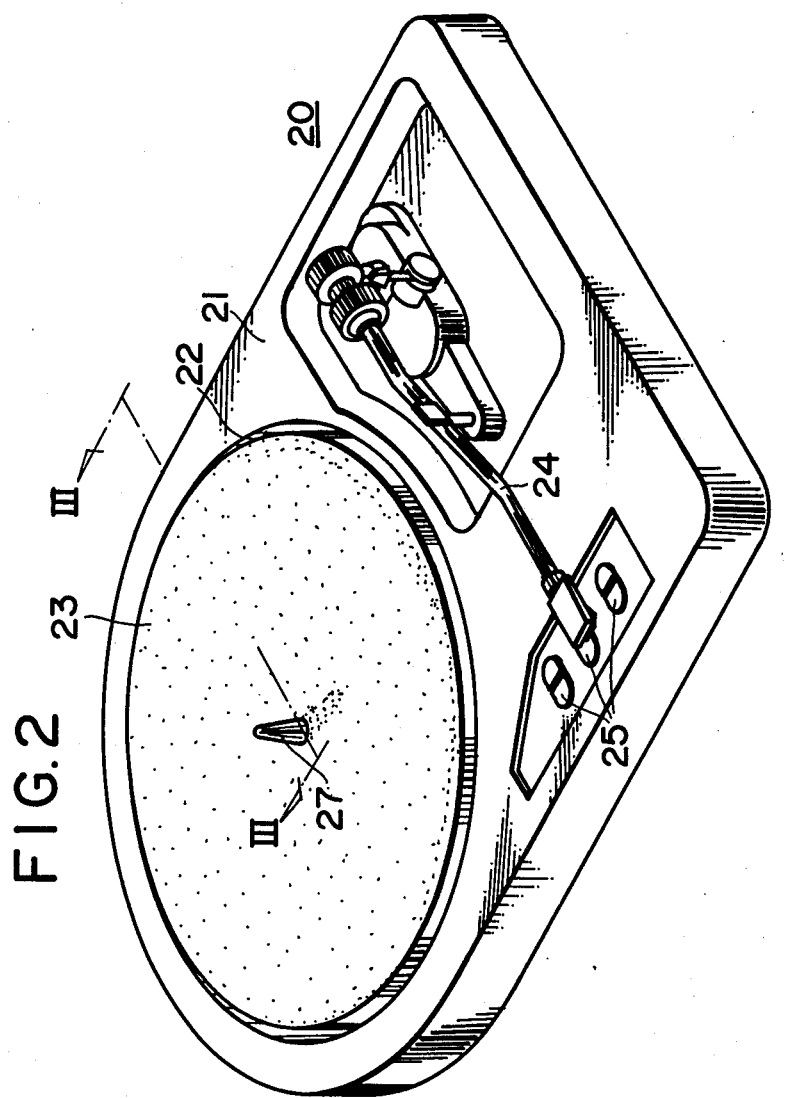
FIG. 2 is a perspective view of a record player, according to a first embodiment of this invention.

Referring now to FIG. 2, it will be seen that a record player 20 according to this invention, is provided with a substantially flat casing 21. A circular, upwardly opening recess 22 is provided in casing 21 and receives a turntable 23. A tone arm 24 is mounted alongside the turntable 23 and an arrangement of touch switches 25 is also provided for controlling the operation of the phonograph 20.

Figure 3:
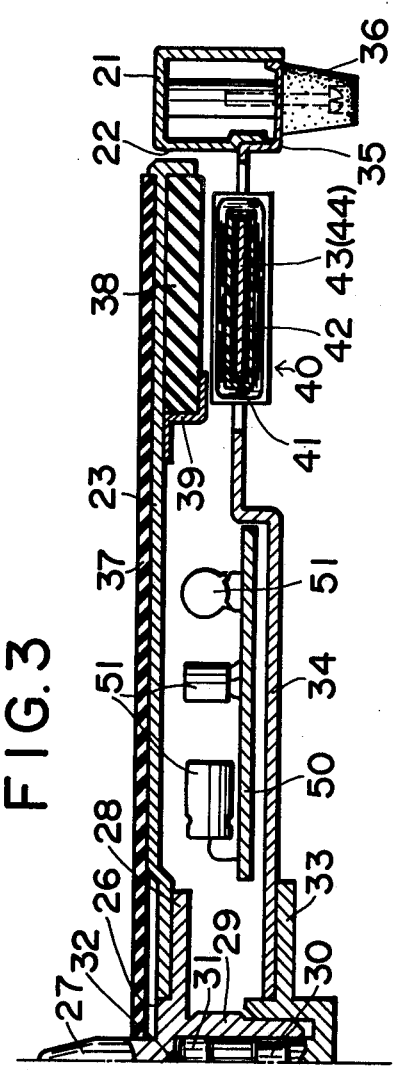
FIG. 3 is an enlarged cross-sectional view taken along the line III—III on FIG. 2.
Figure 4:
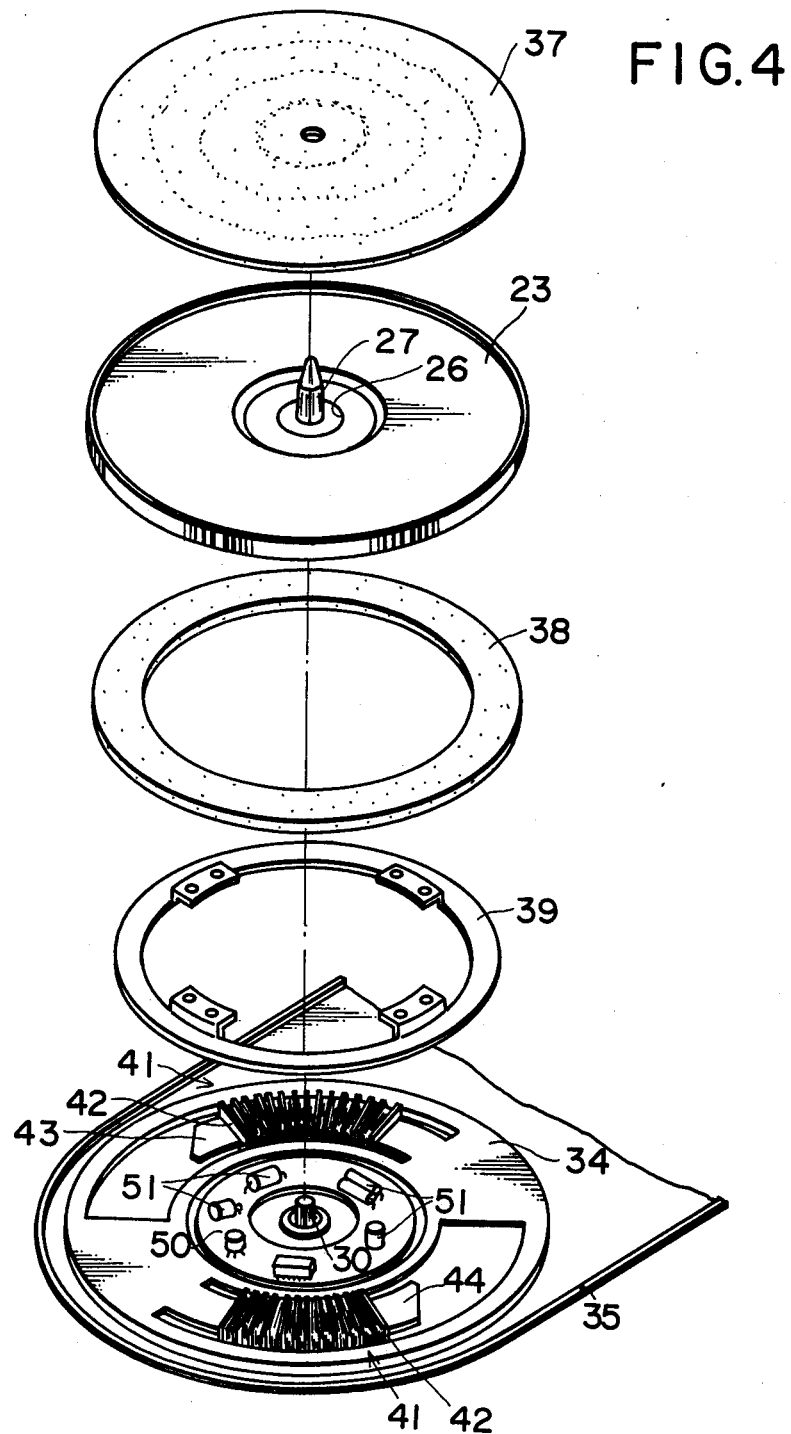
FIG. 4 is an exploded perspective view of the turntable assembly of the record player shown on FIG. 2.

The construction of the turntable assembly of phonograph 20 is shown in greater detail on FIGS. 3 and 4. At the center of the turntable 23, a through-hole 26 is formed to receive a spindle 27. The spindle 27 is provided with an integral flange 28 and a bearing sleeve 29. The flange 28 suitably secures turntable 23 to spindle 27, and sleeve 29 fits over a pivot shaft 30 by which turntable 23 is rotatably supported. A thrust bearing 31 (preferably of synthetic resin) is affixed to the top of the pivot shaft 30. A ball 32 is secured within the sleeve 29 at the top portion thereof so as to contact thrust bearing 31. The weight of turntable 23 is borne by thrust bearing 31 and ball 32. The pivot shaft 30 is shown to have an integral flange 33 which is suitably connected with a chassis plate 34 so that the latter supports pivot shaft 30. A stepped portion 35 is formed at the outer margin of chassis plate 34 to support the casing 21. Further, support members 36, such as rubber feet, are attached to stepped portion 35. A rubber sheet or pad 37 is provided on turntable 23 to cushion a phonograph record when placed on the turntable 23.

An annular rubber magnet 38 is attached to the underside of turntable 23 by an annular member 39 (FIG. 4). The magnet 38 is preferably molded of rubber mixed with a ferrite powder. Another type of magnet, such as a sintered ferrite magnet may also be used. However, such a large sintered ferrite magnet would be fragile and subject to fracturing. On the other hand, a large magnet can be easily manufactured by molding of rubber, and the resulting rubber magnet, such as, magnet 38, is not subject to such breakage.

Figure 5:
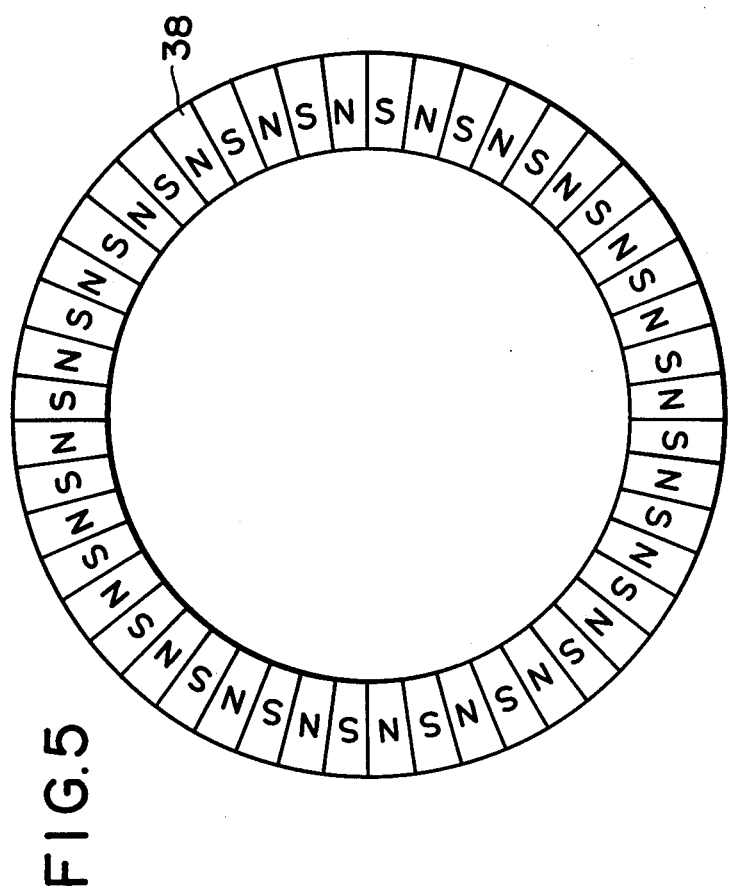
FIG. 5 is a diagrammatic plan view of a rubber magnet for driving the turntable assembly of FIGS. 2–4.

The rubber magnet 38 forms the rotor magnet of a brushless DC motor 40 for driving turntable 23, and the stator of such motor is constituted by coil assemblies 41. As shown on FIG. 5, rubber magnet 38 is divided circumferentially into forty-eight sections. The sections denoted by "N" are polarized so that the lines of flux flow out of the drawing, while those sections denoted by "S" are polarized so that the lines of flux flow into the drawing. In other words, the sections N are magnetized so that the top or upper surfaces in the axial direction of spindle 27 are north magnetic poles, while their bottom or lower surfaces are south magnetic poles. Conversely, the sections S are magnetized so that their upper surfaces are south magnetic poles and their lower surfaces are north magnetic poles. Thus, the sections of magnet 38 are magnetized so that the direction of magnetization of the annular rubber magnet 38 alternates from each section to the next adjacent section. In the case of the present invention, turntable 23 acts as the rotor yoke for magnet 38. Thus, the flux from each section N of magnet 38 flows upwardly, and passes through the yoke formed by turntable 23 into both adjacent, oppositely-polarized sections S.

As illustrated on FIG. 4, two coil assemblies 41 are arranged directly beneath rubber magnet 38 so as to constitute the stator of motor 40. The coil assemblies 41 are each formed of a plurality of individual coils formed of wire wound around individual bobbins 42, and one of a pair of tongues 43, 44 formed integrally with chassis plate 34. The tongues 43, 44 penetrate hollow cores of the respective bobbins 42 and constitute the ferromagnetic cores for the coil assemblies 41. The tongues 43, 44 formed integrally with the chassis plate 34 are shaped as segments of a ring concentric with spindle 27 of the turntable.

Figure 6:
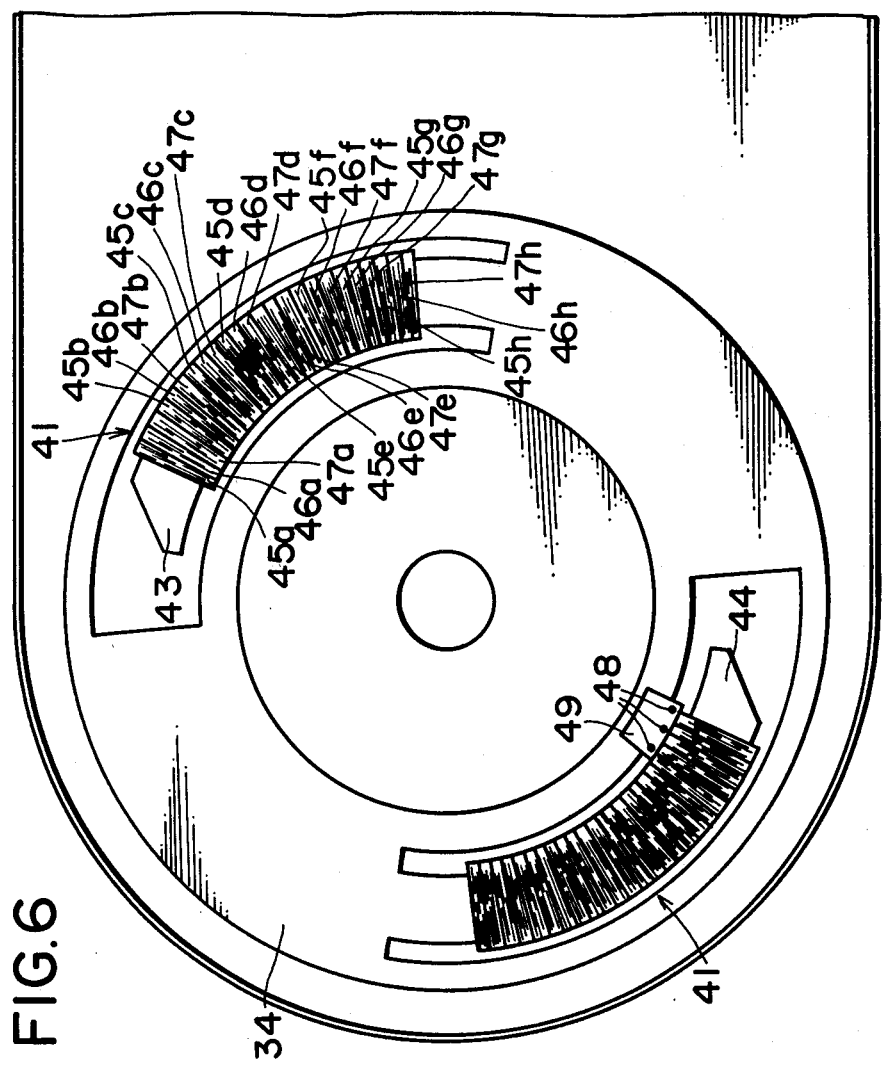
FIG. 6 is a plan view of a coil assembly for use in the turntable assembly of FIGS. 2–4.
Figure 7:
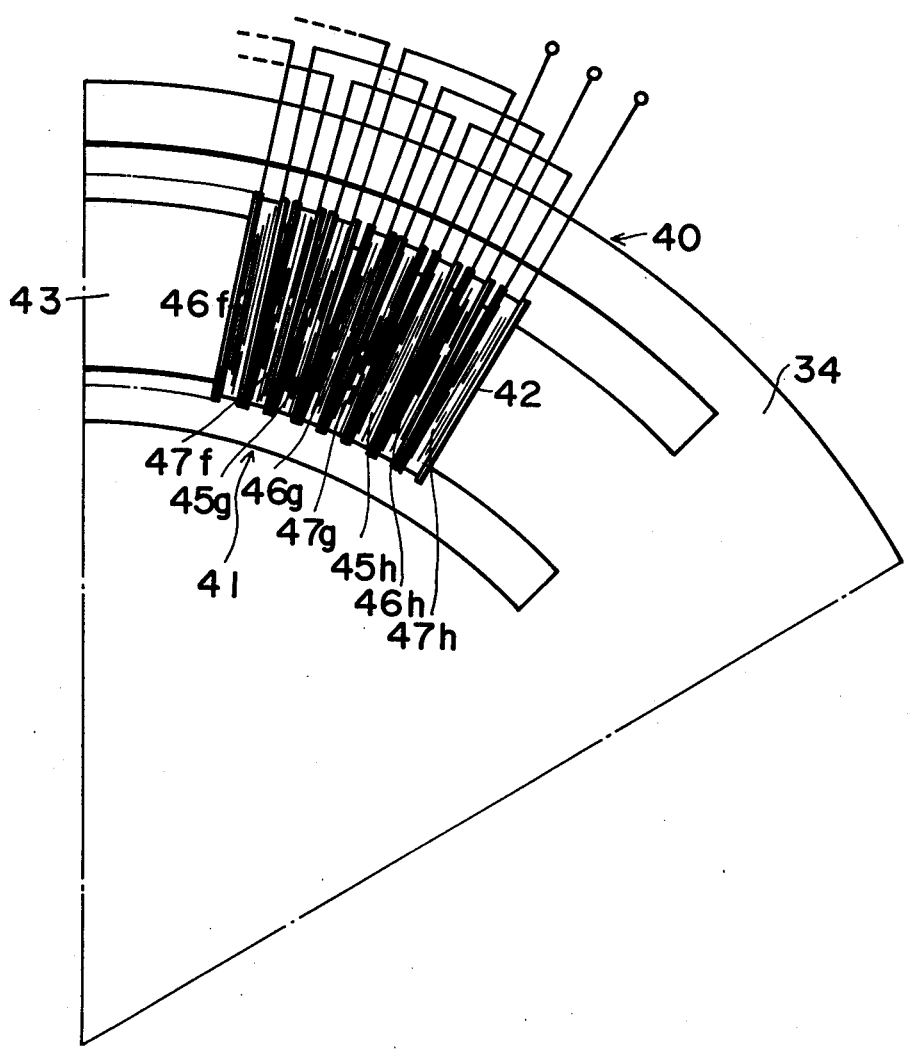
FIG. 7 is a partial enlarged plan view of a portion of the coil assembly shown in FIG. 6.

As shown in FIG. 6, each of the coil assemblies 41 includes twenty-four coils 45a,46a,47a,45c,46c,47c,45d,46d,47d,45e,46e,47e,45f,46f,47f,45g,46g,47g,45h,46h and 47h wound on respective bobbins. The coil assemblies 41 are arranged symmetrically at diametrically opposite sides of the axis of spindle 27 and pivot shaft 30. The coil assemblies 41 are arranged so that each set of three adjacent coils subtends a rotational angle of 7.5° which angle is equal to the circumferential angle subtended by each section N or S of rubber magnet 38. Thus, each coil is arranged to subtend an angle of 2.5°, as shown in FIG. 7. The coils 45a,45b,45c,45d,45e,45f,45g, and 45h are connected together in series. Similarly, the coils 46a,46b,46c,46d,46e,46f,46g, and 46h are connected in series, as are the coils 47a,47b,47c, 47d,47e,47f,47g, and 47h.

Figure 8:
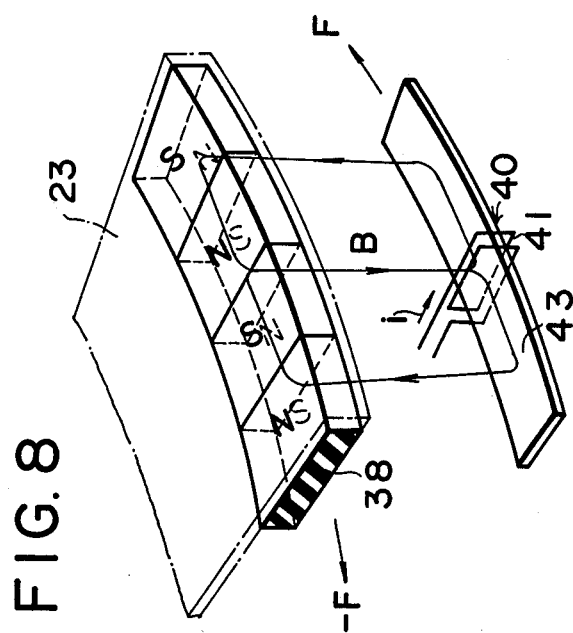
FIG. 8 is a schematic perspective view to which reference will be made in explaining the operation of the drive mechanism for the turntable assembly of FIGS. 2–7.

As shown in FIG. 6, a position detector is formed of three Hall elements 48 on a supporting plate 49 which is mounted on chassis plate 34 near one of the coil assemblies 41. The Hall element 48 are spaced from each other at angular intervals of 5° and are intended to sense the magnetic field of rubber magnet 38 and thereby detect the angularly position thereof; a suitable conventional electrical circuit (not shown) controlled by Hall element 48 may be provided to cause the current supplied through coils 45a–45h, 46a–46h, 47a–47h, in order, to be changed over in accordance with the detected position of magnet 38. As shown in FIG. 8, the current i flowing through each coil assembly 41 crosses the magnetic flux B generated by rubber magnet 38. Consequently, each stator or coil assembly 41 is subjected to a force F determined by Fleming's left-hand rule, and rubber magnet 38 is subjected to an equal and opposite reaction force −F so that a driving torque is applied to turntable 23.

As shown in FIGS. 3 and 4, the electrical circuitry for controlling the turntable assembly may be formed on a doughnut-shaped printed circuit board 50. The board 50 is arranged between turntable 23 and the chassis plate 34 and surrounds the pivot shaft 30. Electrical components, for example, as indicated at 51, are mounted on one surface of board 50 and are connected by conductive patterns printed on the other surface of the board.

With the above-described arrangement, it is possible to provide a record player of substantially flat shape because the thickness of the record player is substantially determined by the thickness of turntable 23, the thickness of rubber magnet 38, and the thickness of coil assemblies 41. Since turntable 23 together with magnet 38 constitutes the rotor of electric motor 40, and coil assemblies 41 on tongues 43, 44 integral with base 35 constitute the stator, it is apparent that the number of parts required to construct the record player is minimized. Furthermore, since rubber magnet 38 provides a substantial portion of the moment of inertia of the turntable 23, and the rubber magnet is dimensioned to be attached to turntable 23 in close proximity to the circumference of the latter, the turntable 23 is afforded an enhanced fly wheel effect, and smooth rotation of the turntable 23 is assured. Because the diameter of the rubber magnet 38 is large, and the distance from the coil assemblies 41 to the spindle 27 is corresponding large, the motor 40 enjoys a large lever arm as compared with conventional drive motors for turntable assemblies. Therefore, in the described example of this invention sufficient torque to rotate the turntable 23 is obtained, even though the rubber magnet 38 is weakly magnetized as compared with a rotor magnet in a conventional drive motor. Further, only a relatively small current need be applied to coil assemblies 41.

The construction of coil assemblies 41 is relatively simple. The individual coils 45a–45h, 46a–46h, 47a–47h, can be wound on bobbins 42 on an ordinary winding machine, and the bobbins can then be mounted on the respective tongues 43, 44 merely by inserting the latter through the hollow portions of the bobbins 42. The bobbins 42 can be easily fixed on the tongues 43, 44 by adhesive or the like.

Because the turntable 23 serves as a yoke for rubber magnet 38, it acts as a shield to prevent magnetic flux from penetrating to the top side of the turntable 23. Further, rubber magnet 38 can have a relatively low magnetization, as mentioned above, and the rubber magnet 38 is positioned near the periphery of the turntable 23 and relatively outside the outermost sound groove of a record disc to be supported on turntable 23. Thus, leakage magnetic flux from magnet 38 and from coil assemblies 41 is prevented from generating noise in a magnetic pick up cartridge located at the end of tone arm 24 when a record is being player on the turntable 23.

Another embodiment of the invention is shown in FIG. 9 in which elements corresponding to those in the previously described embodiment are identified by the same reference numerals, and the description thereof is omitted. The phonograph record player illustrated by FIG. 9 incorporates a yoke 55 which is U-shaped in cross-section, and is mounted between magnet 38 and turntable 23. The yoke 55 effectively prevents magnetic flux from leaking upward and interfering with the operation of a magnetic pick-up or cartridge.

A third embodiment of the present invention is shown in FIGS. 10 and 11 in which, once again, the elements corresponding to those in the previously described embodiments are identified by the same reference numerals and the description thereof is omitted. In the embodiment of FIGS. 2–8, and the embodiment of FIG. 9, the magnet 38 and the coil assemblies 41 are arranged opposite each other or confront in the vertical or axial direction. Also, in the first and second described embodiments, tongues 43,44 are arranged in a plane parallel to the turntable 23. In contrast to the foregoing, the magnet 38' and coil assemblies 41' in the embodiment of FIGS. 10 and 11 are aligned or confront each other in the horizontal or radial direction. As shown, particularly on FIG. 11, the tongues 43',44' are vertically formed at connecting portions 56,57, respectively, with the chassis plate 34. The tongues 43',44' are formed as portions of a cylinder which is concentric with the axis of turntable 23 and extends perpendicular to the plane chassis plate 34. The coil assemblies 41 are mounted on the tongues 43',44' and are arranged radially within the circular path of rubber magnet 38'. In other words, the annular rubber magnet 38' is arranged at a greater radial distance from the spindle 27 than are the coil assemblies 41'. However, it also possible to construct a turntable assembly in which the coil assemblies 41 are outside the rubber magnet 38, that is, in which the magnet 38 is nearer than the coil assemblies 41 to the spindle 27.

Although the above described embodiments of this invention have the permanent magnet 38 or 38' attached to the turntable 23, it is also possible to construct a turntable assembly according to this invention in which the coil assemblies 41 or 41', rather than the permanent magnet, are secured to the turntable 23, and the permanent magnet 38 or 38' is attached to the base or chassis 34. In such a turntable assembly, electric current can be supplied to the coils through brushes or the like.

It is preferable that the turntable 23 be manufactured by alternately layering sheets of rubber and plates of ferro magnetic material, such as steel. The layered arrangement of the steel plates both protects and supports the rubber layers, and prevents the leakage of flux from affecting a magnetic cartridge on the tone arm 24.

Although illustrative embodiments of this invention have been described in detail herein with reference to the accompanying drawings, it is to be understood that the invention is not limited to those precise embodiments or to the described modifications, and that various changes and further modifications may be made therein by one skilled in the art without departing from the scope or spirit of the invention as defined in the appended claims.

What we claim is:

1. A phonograph record player comprising:
   a base;
   a turntable rotatably mounted on said base;
   rotor motor mounted on said turntable for providing a magnetic field, said rotor means including an annular magnet arranged coaxially on said turntable on the side of the latter facing said base; and
   stator means fixed relative to said base so as to confront the magnetic field of said rotor means for exerting a torque on the rotor means, thereby causing said turntable to rotate, said stator means including coil means arranged upon respective tongue means formed integrally with said base, each said tongue means constituting a magnetic core for the respective coil means.

2. A phonograph record player according to claim 1; wherein said turntable is disc-shaped and, to achieve dynamic stability in rotation of the turntable, said annular magnet is attached to said turntable in close proximity to the circumference of the turntable.

3. A phonograph record player according to claim 1; wherein said turntable includes at least one layer of rubber sheet alternating with at least one layer of ferromagnetic metal, wherein said ferromagnetic material acts as a shield to prevent magnetic flux from said rotor means and stator means from pentrating beyond said turntable.

4. A phonograph record player according to claim 1; wherein said rotor means further includes a rotor yoke arranged between said turntable and said annular magnet.

5. A phonograph record player according to claim 1; wherein said annular magnet is a rubber magnet.

6. A phonograph record player according to claim 5; wherein said rubber magnet is molded of a mixture of rubber and a ferrite powder.

7. A phonograph record player according to claim 1; wherein said annular magnet consists of n circumferentially arranged sections, where n is a positive even integer, and said sections are magnetized so that the direction of magnetization of the annular magnet alternates from each section to the next adjacent section.

8. A phonograph record player according to claim 7; further comprising means for detecting the angular position of said annular magnet.

9. A phonograph record player according to claim 8; wherein said means for detecting is arranged on said base facing said annular magnet and is adapted to control current supplied to said stator means in dependence upon the detected angular position of said annular magnet.

10. A phonograph record player according to claim 9; wherein said means for detecting includes a plurality of Hall elements supported adjacent said stator means.

11. A phonograph record player accord to claim 1; wherein each said coil means includes a plurality of bobbins on which wire coils are wound and which have hollow portions through which the respective tongue means extends.

12. A phonograph record player according to claim 11; wherein each said tongue means is formed as a segment of a ring concentric with said turntable.

13. A phonograph record player according to claim 12; wherein each said tongue means is arranged in a plane parallel to that of said turntable, and said annular magnet is arranged on said turntable to confront said coil means in the axial direction of the turntable.

14. A phonograph record player according to claim 12; wherein each said tongue means is arranged so as to form a portion of a cylinder concentric with said turntable and extending perpendicular thereto, and said annular magnet is arranged on said turntable to confront said coil assemblies in the radial direction of said turntable.

15. A phonograph record player according to claim 14; wherein said annular magnet is arranged at a greater distance from the center of said turntable than are said coil means.

16. A phonograph record player according to claim 1; wherein said base includes a stepped portion and a casing supported on said stepped portion and defining a recess in which said turntable is located, whereby the thickness of the record player in the axial direction of the turntable is substantially determined by the thickness of the turntable, the rotor means, and the stator means.

17. A phonograph record player according to claim 16; further including a printed circuit board arranged between the turntable and the base in the axial direction of the turntable and adapted to bear electrical circuitry for controlling the torque exerted on the rotor means in dependence on the angular position of the turntable.

18. A phonograph record player according to claim 16; further comprising a spindle secured to said turntable and being provided with an integral sleeve, and a pivot shaft fixed on said base, said integral sleeve being fitted rotatably on said pivot shaft, whereby said turntable is rotatably supported by said base.

19. A phonograph record player according to claim 18; wherein a thrust bearing is arranged on an end of said pivot shaft, and said sleeve contains a ball secured inside said sleeve to contact said thrust bearing and to bear the weight of said turntable.

* * * * *